(12) United States Patent
Tapley et al.

(10) Patent No.: US 10,557,404 B2
(45) Date of Patent: Feb. 11, 2020

(54) COOLING MODULE

(71) Applicant: Westinghouse Air Brake Technologies Corporation, Wilmerding, PA (US)

(72) Inventors: Joseph Tapley, Medon, TN (US); Jay S. Korth, Jackson, TN (US); Rory Mahlon Romero, Henderson, TN (US); Jake Plewa, Dyersburg, TN (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 331 days.

(21) Appl. No.: 15/653,836

(22) Filed: Jul. 19, 2017

(65) Prior Publication Data

US 2019/0024573 A1 Jan. 24, 2019

(51) Int. Cl.
  *F02B 29/04* (2006.01)
  *F01P 11/10* (2006.01)
  *F01P 3/18* (2006.01)
  *F01P 5/06* (2006.01)
  *F01P 7/10* (2006.01)

(52) U.S. Cl.
  CPC ............ *F02B 29/0431* (2013.01); *F01P 3/18* (2013.01); *F01P 5/06* (2013.01); *F01P 7/10* (2013.01); *F01P 11/10* (2013.01); *F02B 29/0443* (2013.01); *F02B 29/0493* (2013.01); F01P 2003/185 (2013.01); F01P 2060/02 (2013.01);
  (Continued)

(58) Field of Classification Search
  CPC .. F02B 29/0431; F02B 29/04; F02B 29/0412; F02B 29/0425; F02B 29/0456; F02B 29/0493; F02B 29/0443; F01P 7/10; F01P 5/06; F01P 2060/02; F01P 2070/50; F01P 11/10; F01P 3/18; F01P 2003/182; F01P 2003/185; F01P 2003/187
  USPC ....... 123/563, 41.48, 41.49, 41.56, 540, 542
  See application file for complete search history.

(56) References Cited

U.S. PATENT DOCUMENTS

| 4,660,532 A | * | 4/1987 | Tholen ................ F02B 29/0431 |
| | | | 123/563 |
| 9,945,578 B2 | | 4/2018 | Vanberg et al. |

(Continued)

OTHER PUBLICATIONS

Pelican Energy Partners, "Pelican Energy Partners Announces Significant Investment in Quinn Artificial Lift Services", Jan. 2017.

*Primary Examiner* — Mark A Laurenzi
*Assistant Examiner* — Mickey H France
(74) *Attorney, Agent, or Firm* — Christopher R. Carroll; The Small Patent Law Group, LLC

(57) ABSTRACT

A cooling module for use with an internal combustion engine having separate cooling circuits, the cooling module having a cuboid shaped structure having walls defining an internal open portion, at least one of the walls comprising a low-temperature heat exchanger circuit and one of the walls comprising a high-temperature heat exchanger circuit and a fan located within the open portion of the structure and enclosed by the walls. The fan is configured to act as a sucker fan to draw air from outside the structure through the at least one low-temperature heat exchanger circuit and to act as a blower fan by redirecting the air out of the structure through the at least one high-temperature heat exchanger circuit. The cooling module has increased fan efficiency, reduced noise, and optimal functional heat exchanger face area per given space.

20 Claims, 6 Drawing Sheets

(52) U.S. Cl.
CPC ....... *F01P 2060/04* (2013.01); *F01P 2060/10* (2013.01); *F01P 2070/50* (2013.01)

(56) References Cited

U.S. PATENT DOCUMENTS

| | | |
|---|---|---|
| 9,970,720 B2 | 5/2018 | Vanberg et al. |
| 2008/0283220 A1* | 11/2008 | Martin .................... F01P 11/12 165/95 |
| 2009/0078219 A1* | 3/2009 | Marsh ...................... F01P 1/06 123/41.02 |
| 2009/0310300 A1* | 12/2009 | Chrysler ............ H05K 7/20681 361/691 |
| 2012/0247712 A1* | 10/2012 | Schertz .................. F28F 27/00 165/41 |
| 2017/0292735 A1 | 10/2017 | Hjorth et al. |
| 2017/0292736 A1 | 10/2017 | Hjorth et al. |
| 2017/0292789 A1 | 10/2017 | Hjorth et al. |
| 2017/0292800 A1 | 10/2017 | Vanberg et al. |
| 2017/0292801 A1 | 10/2017 | Vanberg et al. |
| 2017/0294103 A1 | 10/2017 | Vanberg et al. |
| 2017/0294366 A1 | 10/2017 | Vanberg et al. |
| 2018/0003532 A1 | 1/2018 | Vanberg et al. |
| 2019/0017747 A1* | 1/2019 | Sakaray ................... F28D 1/06 |

\* cited by examiner

COOLING MODULE

BACKGROUND OF THE INVENTION

Field of the Invention

The present disclosure is directed to cooling modules or heat exchanger systems for engines, and more particularly, to cooling modules or heat exchanger systems for cooling internal combustion engines having two cooling circuits, such as heavy duty diesel engines, including a low-temperature heat exchanger circuit having a large face area in combination with a high-temperature heat exchanger circuit having a large mass flow. The cooling module can also be used for other applications including industrial cooling towers or industrial fluid cooling in various applications such as petrochemical plants and other types of locations, or any other type of application where one or more lower temperature coolants is cooled first which is then followed by the cooling of a higher temperature fluid. The cooling module design results in optimal fan performance and optimal functional heat exchanger face area per given space.

Description of Related Art

Traditional cooling systems for large scale turbo diesel engines typically include two cooling loops, one for aftercooling, such as Air-to-Air Aftercooler (ATAAC) or Separate Circuit Aftercooler (SCAC), which is commonly referred to as a low-temperature circuit and one for the engine jacket water (JW), which is commonly referred to as a high-temperature circuit. The high-temperature circuit, including jacket water, cools the engine block.

Current systems position the high-temperature and low-temperature radiators or circuits in either a front to back or side to side configuration. In the front to back configuration, both circuits generally have the same face area. In the side to side configuration, one can adjust the amount of face area each circuit has to achieve the necessary cooling. Either one of these configurations can be combined with a sucker or blower fan. One disadvantage to the front to back configuration is that the face area of the high-temperature circuit and low-temperature circuit is that the face area of the respective circuits must be essentially the same. As such, if the low-temperature circuit requires more face area to meet the needs of a certain application, then it is necessary to add more face area to the high-temperature circuit and vice versa. A disadvantage of the side to side configuration is that the face area becomes limited and more depth must be used, which is less efficient.

Sucker fan configurations are generally used in mobile applications where the radiator is mounted on the front of the vehicle and ram air can be achieved during operation. In this scenario, this fan is typically mounted to the engine. One difficulty with this configuration is that the fan operates at a relatively high-temperature, which decreases its efficiency and/or performance of the fan. For this reason, the use of blower fan configurations is generally preferred.

Increased emission standards have led to higher engine heat rejections, with an emphasis on the heat rejection of the low-temperature circuit. The low-temperature circuit directly impacts the engine inlet manifold temperature and emissions. The low-temperature circuit must always receive the coldest cooling air. In general, the low-temperature circuit is sensitive to air temperature and the high-temperature circuit is sensitive to air flow rate. Both circuits improve with face area.

Accordingly, there is a need in the art for a cooling module having increased face area for the low-temperature circuit relative to the high-temperature circuit, an increased air mass flow through the high-temperature circuit relative to the low-temperature circuit, an optimization of fan performance, and an arrangement of the cores of the high and low-temperature circuits to achieve optimal functional heat exchanger face area per given space.

SUMMARY OF THE INVENTION

In accordance with an embodiment of the present disclosure, a cooling module is provided that comprises a box shaped structure having at least four sides forming walls of the structure, the walls defining an open portion within the structure, wherein at least one of the walls comprises at least one low-temperature heat exchanger circuit and at least one of the walls comprises a high-temperature heat exchanger circuit. The cooling module also includes at least one fan located within the open portion of the structure. The fan is configured to draw air from outside the structure through the at least one low-temperature heat exchanger circuit and redirect the air out of the structure through the at least one high-temperature heat exchanger circuit. It can be appreciated that multiple fans can be provided within the cooling module. The walls can comprise at least three sidewalls and a top wall. The walls can also comprise four sidewalls and a top wall. At least one of the sidewalls comprises the low-temperature heat exchanger circuit and the top wall comprises the high-temperature heat exchanger circuit.

According to one embodiment, at least two sidewalls comprise low-temperature heat exchanger circuits, and wherein the at least two sidewalls comprising the low-temperature heat exchanger circuits are oppositely disposed with respect to each other. According to another embodiment, the walls can comprise four sidewalls, a top wall, and a bottom wall.

The particular arrangement of the invention results in drawing cool air from outside the structure such that it flows through the oppositely disposed low-temperature heat exchanger circuits and then exits in an upward direction through the high-temperature heat exchanger circuit.

The fan comprises a constant volumetric flow machine and is configured to function as a sucker fan relative to the at least one low-temperature heat exchanger circuit and a blower fan relative to the high-temperature heat exchanger circuit. The fan is enclosed within the sidewalls of the structure which reduces the noise of the fan.

The particular arrangement of the invention results in the low-temperature heat exchanger circuits having a face area that is greater than a face area of the high-temperature heat exchanger circuit. For example, in one arrangement where at least two low-temperature circuits form two sidewalls of the structure, the face area of the combined low-temperature heat exchanger circuits can be at least twice as large as the face area of the high-temperature heat exchanger circuit.

According to one embodiment, the low-temperature heat exchanger circuit and the high-temperature heat exchanger circuit can include multiple cores. It can be appreciated that various combinations of cores can be located in the low-temperature and/or the high-temperature circuits to meet particular performance standards depending upon the use of the cooling module.

According to a further embodiment, the structure can comprise a cuboid having six walls disposed orthogonal to each other. These six walls can include four sidewalls, a top wall and a bottom wall wherein at least two of the sidewalls comprise the low-temperature heat exchanger circuits, at least two of the sidewalls can comprise a pair of standard wall panels, the top wall comprises the high-temperature heat exchanger circuit, and the bottom wall can comprise either a standard wall panel or a low-temperature heat exchanger circuit. According to one embodiment, the low-temperature heat exchanger circuits can be oppositely disposed with respect to one another and the standard wall panels can be oppositely disposed with respect to each other. It can be appreciated that at least some of the six walls can be sized differently with respect to each other.

In accordance with another embodiment, a cooling module for use with an internal combustion engine having separate cooling circuits is provided. One example for which the cooling module can be used is for cooling a heavy duty diesel engine. The cooling module includes a cuboid shaped structure having walls defining an internal open portion, at least one of the walls comprising a low-temperature heat exchanger circuit and one of the walls comprising a high-temperature heat exchanger circuit and at least one fan located within the open portion of the structure and enclosed by the walls, wherein the at least one fan is configured to draw air from outside the structure through the at least one low-temperature heat exchanger circuit and redirect the air out of the structure through the at least one high-temperature heat exchanger circuit. It can be appreciated that multiple fans positioned according to various arrangements can be provided. According to one embodiment, the walls can comprise four sidewalls, a top wall, and a bottom wall, wherein at least two of the sidewalls comprise the low-temperature heat exchanger circuits which are oppositely disposed with respect to each other and the top wall comprises the high-temperature heat exchanger circuit.

The fan can comprise a constant volumetric flow machine that is configured to function as a sucker fan relative to the low-temperature heat exchanger circuits to draw air from the outside of the structure through the low-temperature heat exchanger units and to function as a blower fan relative to the high-temperature heat exchanger circuit to redirect and blow the air in a upward direction out of the structure through the high-temperature heat exchanger unit. The high-temperature heat exchanger circuit includes jacket water and is configured to cool an engine block and the low-temperature heat exchanger circuit is configured to cool turbo air from the engine.

DETAILED DESCRIPTION OF THE INVENTION

Figure 1:
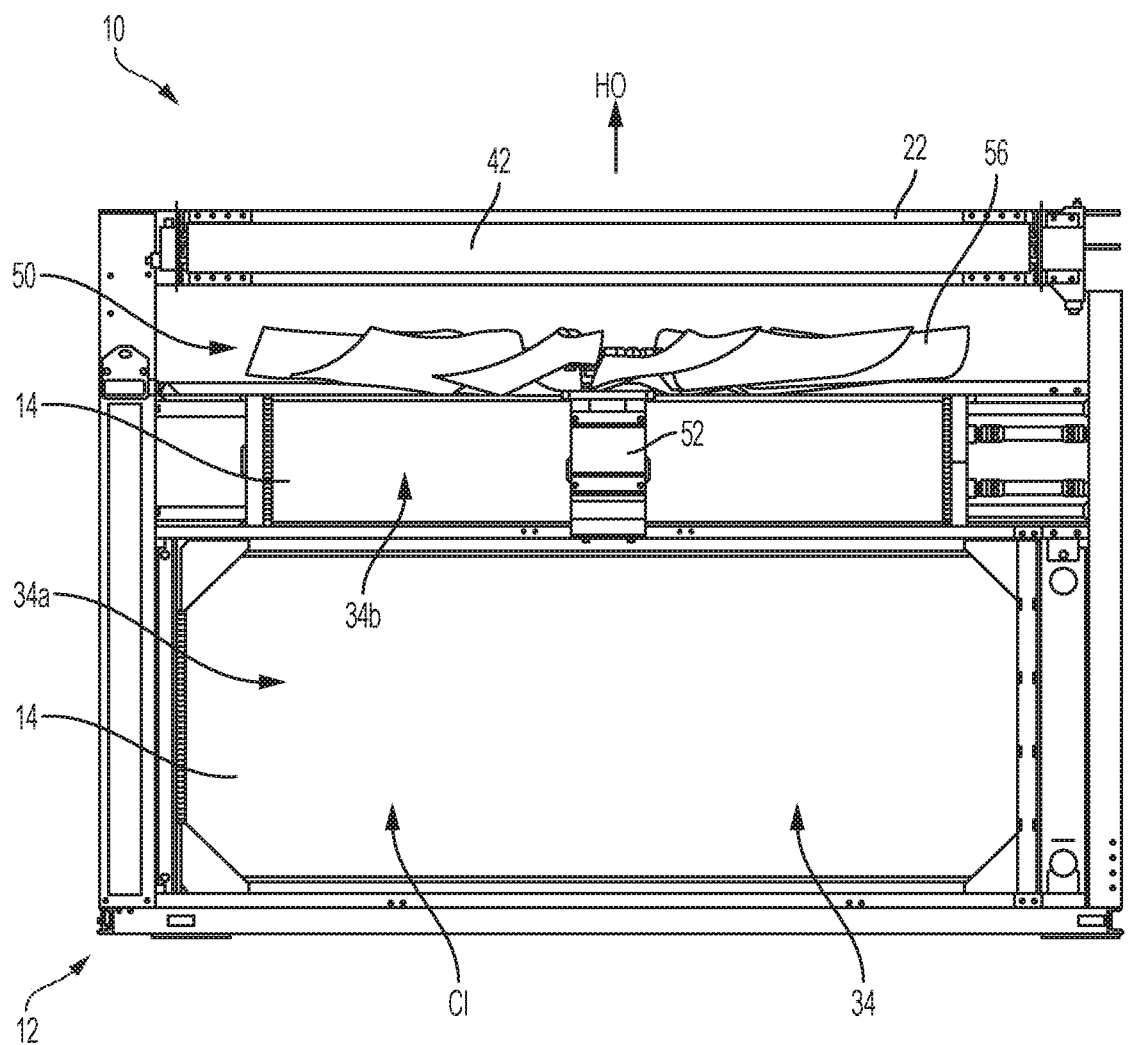
FIG. 1 is a side perspective view of the cooling module for use with an internal combustion engine in accordance with an embodiment of the present disclosure.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 2:
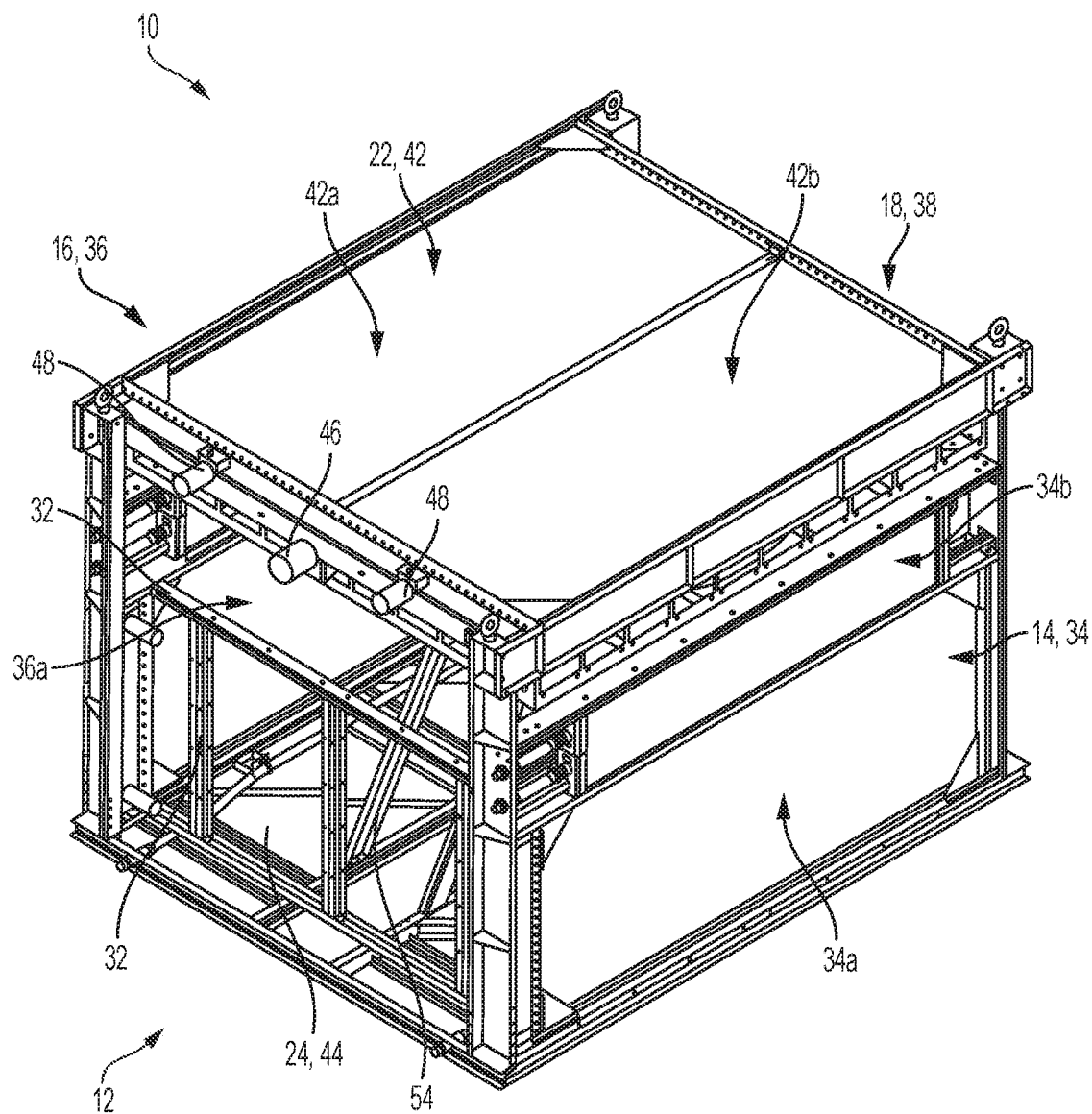
FIG. 2 is a front perspective view of the cooling module of FIG. 1 with the front sidewall panel removed in accordance with an embodiment of the present disclosure.
Figure 3:
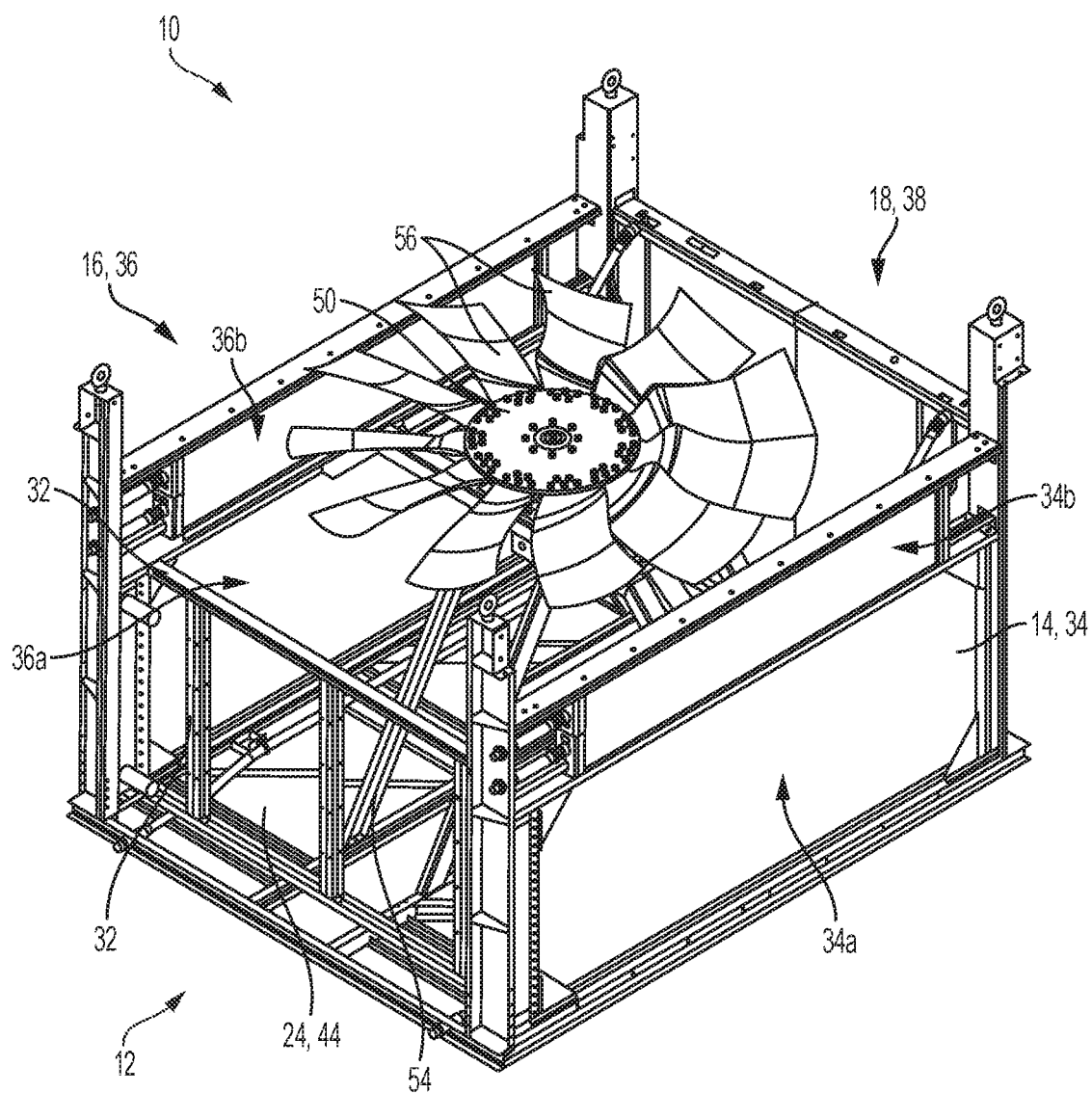
FIG. 3 is a front perspective view of the cooling module of FIG. 2 with the top wall panel removed in accordance with an embodiment of the present disclosure.
Figure 4:
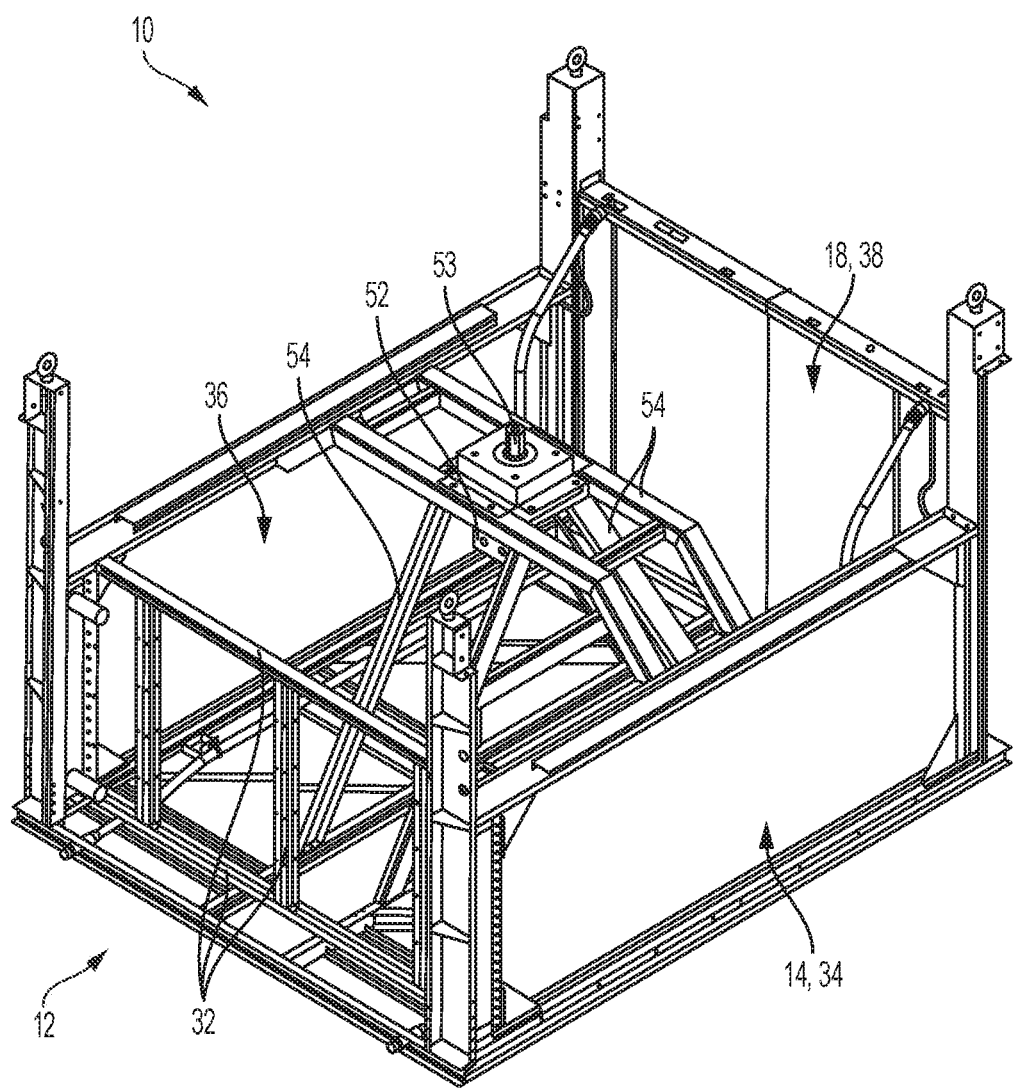
FIG. 4 is a front perspective view of the cooling module of FIG. 3 with the fan removed in accordance with an embodiment of the present disclosure.
Figure 5:
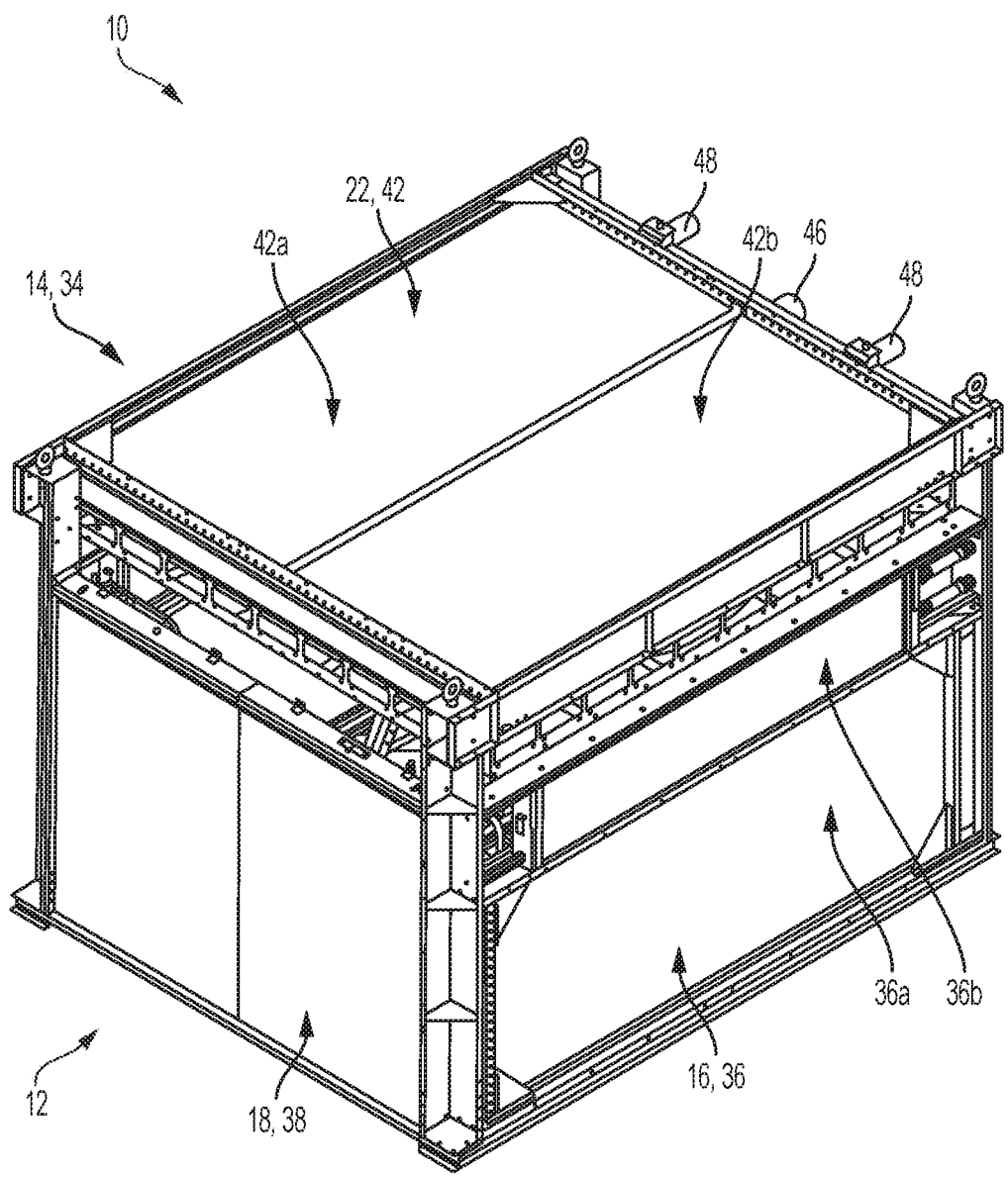
FIG. 5 is a back perspective view of the cooling module of FIG. 1 in accordance with an embodiment of the present disclosure.
Figure 6:
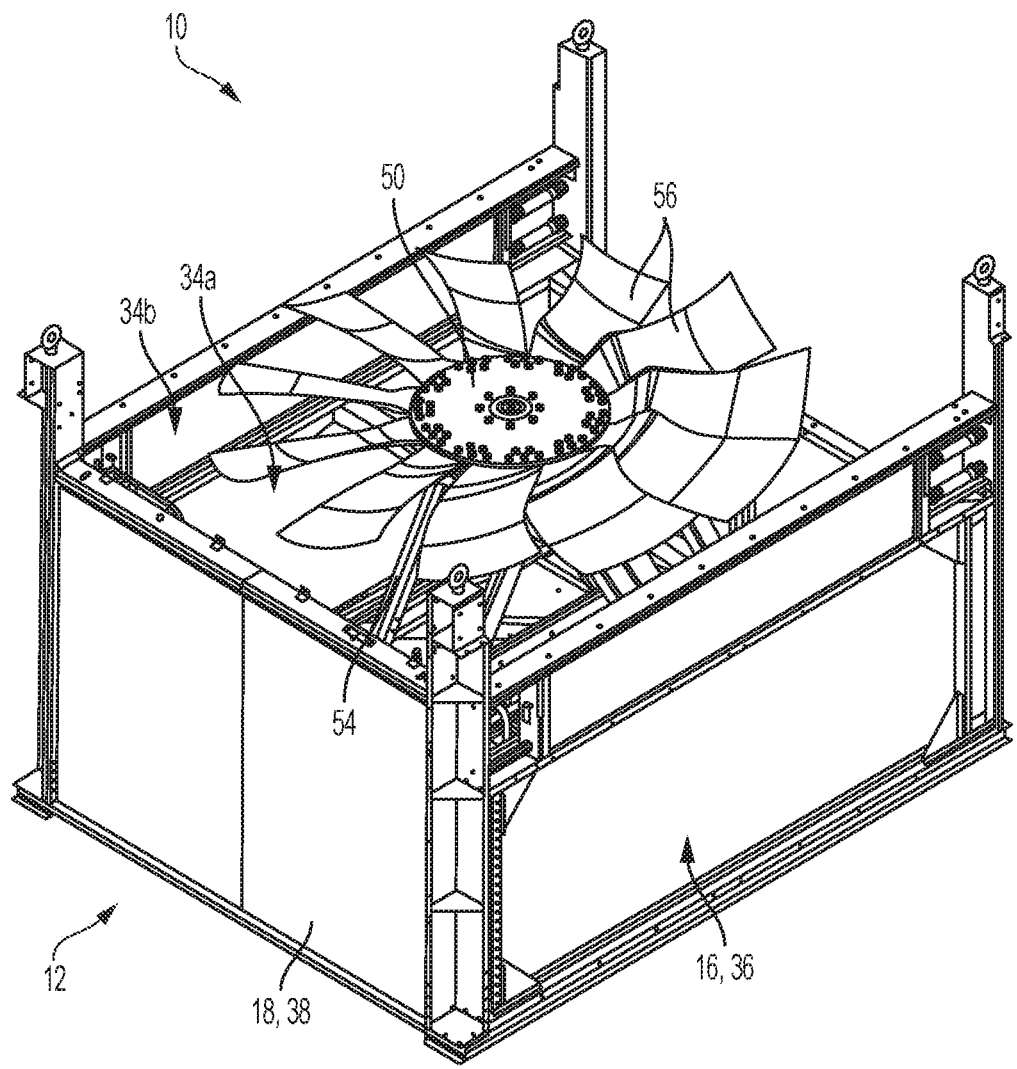
FIG. 6 is a back perspective view of the cooling module of FIG. 5 with the top wall panel removed in accordance with an embodiment of the present disclosure.

Reference is now made to FIGS. 1-6 which show a cooling module, generally indicated as 10, for use with an internal combustion engine. It can be appreciated that the cooling module 10 can be used with any type of internal combustion engine that has two cooling circuits. One example for which the cooling module 10 can be used is with any heavy duty diesel engine utilizing a cooling loop for aftercooling, such as an Air-to-Air Aftercooler (ATAAC) or a Separate Circuit Aftercooler (SCAC) configuration and a cooling loop for the engine jacket water. The cooling module 10 is a box shaped structure 12 that includes at least four sidewalls 14, 16, 18, 20 and a top wall 22. A bottom wall 24 can be provided for the structure 12. Alternatively, the cooling module can be placed on a floor, a pallet, or any other surface that is capable of closing the bottom portion of the cooling module.

With continuing reference to FIGS. 1-6, the sidewalls 14, 16, 18, 20 and top wall 22 define an open portion 30 within the structure 12. The cooling module 10 includes a plurality of support beams 32 located therein. According to one embodiment, at least one of the sidewalls 14 can include a low-temperature heat exchanger circuit 34. According to another embodiment, opposed sidewalls 14 and 16 can include low-temperature heat exchanger circuits 34 and 36 and the other set of opposed walls 18 and 20 can be standard wall panels. It can be appreciated that the invention is not limited to arrangements wherein the sidewalls 14 and 16, that include the low-temperature heat exchanger circuits 34 and 36, are opposed to one another, but also includes arrangements wherein the sidewalls including the low-temperature heat exchanger circuits 34 and 36 are positioned side-by-side and/or adjacent to each other. It also can be appreciated that the invention is not limited to arrangements wherein the standard wall panels are opposed to one another and that any of the sidewalls positioned in any arrangement with respect to one another can function as the standard wall panels 18 and 20. These opposed walls 18 and 20 act as air baffles to ensure that the air only goes through the low-temperature heat exchanger circuits 34, 36. The opposed walls 18 and 20 can be formed from sheets of any known material, such as aluminum or steel, that does not allow air to pass there through. According to yet another embodiment, all of the sidewalls 14, 16, 18, 20, as well as the bottom wall 24 can include low-temperature heat exchanger circuits, 34, 36, 38, 40, 44. The top wall 22 can include at least one high-temperature heat exchanger circuit 42.

The cooling module 10 also includes at least one fan 50 located within the open portion of the structure 12. The fan 50 can be a hydraulic powered fan including a motor 52 and mounting rotor 53, which are supported by support beams 54 located within the structure 12. The fan 50 includes blades 56 that are shaped and/or configured to draw cooling air from outside the structure, as shown by arrow "CI" in FIG. 1, through the low-temperature heat exchanger circuits 34, 36 and redirect the hot air out of the structure 12, as shown by arrow "HO" through the at least one high-temperature heat exchanger circuit 42. It can be appreciated that multiple fans 50 can be provided within the structure 12. For example, the single larger fan 50, as shown in the Figs. can be replaced with multiple smaller fans, such as two or four fans. These multiple fans can be positioned in a side-by-side arrangement or could be stacked vertically with respect to each other. Also, multiple fans can be positioned adjacent to each low-temperature heat exchanger circuit to allow for fine tuning of the cooling effect on a particular day. According to yet another arrangement, two fans can be positioned vertically on top of one another and rotated in opposite directions to improve/optimize efficiency and/or to increase the static pressure performance. It can be appreciated that one of the sidewalls 14, 16, 18, 20, as opposed to the top wall 22, can include the high-temperature heat exchanger circuit 42, however, for increased performance and for safety purposes, the top wall 22 should include the high-temperature heat exchanger circuit so that hot air is discharged vertically and escapes through the top wall 22 of the cooling module 10. Placement of the high-temperature heat exchanger circuit 42 in the top wall 22 increases the performance of the cooling module 10 because heat rises and increases the safety of the cooling module so as to avoid blowing hot air onto bystanders.

The at least one fan 50 comprises a constant volumetric flow machine and is configured to function as a sucker fan relative to the low-temperature heat exchanger circuits 34, 36, 38, 40 and a blower fan relative to the high-temperature heat exchanger circuit 42. Because the fan 50 is enclosed within the sidewalls 14, 16, 18, 20 of the structure 12, the noise emitted by the fan 50 is reduced.

The particular arrangement of the invention results in the low-temperature heat exchanger circuits 34, 36, 38, 40, 44 having a face area that is greater than a face area of the high-temperature heat exchanger circuit 42. For example, in one arrangement, where the cooling module 10 includes a pair of low-temperature heat exchanger circuits 34, 36, the face area of the combined low-temperature heat exchanger circuits 34, 36 can be at least twice as large as the face area of the high-temperature heat exchanger circuit 42.

According to one embodiment, any or all of the low-temperature heat exchanger circuits 34, 36, 38, 40, 44 can include multiple cores such as illustrated by 34a, 34b, 36a, 36b in FIGS. 1-3 and 5-6. Additionally, the high-temperature heat exchanger circuit 42 can include multiple cores, as illustrated by 42a, 42b in FIG. 5. It can be appreciated that various combinations of cores can be located in the low-temperature and/or the high-temperature circuits 34, 36, 38, 40, 44, 42 to meet particular performance standards, depending upon the use of the cooling module 10. It can also be appreciated that the cores can have any known type of fin and tube arrangement and be formed by well known materials. These arrangements include, but are not limited to, staggered, parallel, canted, plate fin, Serpentine, CT, and the like. The tubes of the cores can be attached to a header by any known technique, such as by a mechanical attachment, wherein the individual tubular members are mechanically expanded, rolled or swaged into the openings of the header having similar hole geometry to provide the tube-to-header connection. Alternatively, a brazing material may be used to secure the tubes within holes in the header.

According to a further embodiment, the structure 12 can comprise a cuboid having the six walls 14, 16, 18, 20, 22, 24 disposed orthogonal to each other. These six walls can include the four sidewalls 14, 16, 18, 20, the top wall 22 and the bottom wall 24 wherein at least two of the sidewalls 14, 16 comprise the low-temperature heat exchanger circuits 34, 36 oppositely disposed with respect to each other and the other two sidewalls 18, 20 can comprise a pair of oppositely disposed panels which may or may not include low-temperature heat exchanger circuits 38, 40. The top wall 22 comprises the high-temperature heat exchanger circuit 42 and the bottom wall 24 can comprise either a panel or a low-temperature heat exchanger circuit 44. It can be appreciated that at least some of the six walls 14, 16, 18, 20, 22, 24 can be sized differently with respect to each other.

The high-temperature heat exchanger circuit 42 includes jacket water, engine inlet 46, engine outlet 48, and a surge tank (not shown) which cooperate together to cool an engine block. The low-temperature heat exchanger circuit 34, and optionally low-temperature heat exchanger circuits 36, 38, 40, 44, is configured to cool turbo air from the engine.

One advantage of the present invention is that the cooling module 10 of the present invention operates much more efficiently than the systems currently in use because the fan 50 operates as a sucker fan relative to the low-temperature heat exchanger circuits 34, 36, 38, 40, 44 and a blower fan relative to the high-temperature heat exchanger circuit 42. Thus, the fan 50 operates much more efficiently. This increased efficiency of the fan 50 occurs because the fan 50 is a constant volumetric flow machine. At a given static pressure, the fan 50 does not increase flow rate due to density change at lower temperature, but it does change the static pressure capability of the fan 50, thereby changing the operating point on the fan curve, meaning that there is more flow rate at a higher static resistance. At a given flow rate, an increase in density will result in an increase in mass flow rate. The increase in mass flow rate thereby increases the amount of heat transfer the heat exchanger can perform.

Another advantage of the invention is that the side walls 14, 16, 18, 20 and bottom wall 24 of the cooling module 10 can be used to provide large low-temperature heat exchanger circuit face areas. This allows the low-temperature heat exchanger circuits 34, 36, 38, 40, 44 to have the advantage of face area and fresh air. Yet another advantage of the invention is that a large amount, or even all of the air must exhaust through the high-temperature heat exchanger circuit 42. This provides a large amount of flow rate to cool the high-temperature heat exchanger circuit 42. Still another advantage of the invention is that the fan noise is reduced due to the effect of walls being present on all sides of the fan 50. Yet another advantage of the invention is that fan power consumption is less because the velocity through the low-temperature heat exchanger circuits is low and the main pressure drop is through the high-temperature heat exchanger circuit. Additionally, the heat exchanger circuits function as a fan guard, eliminating the need for a separate fan guard, thus improving the efficiency of the cooling module.

The following example is presented to demonstrate the principle of the increased fan efficiency in accordance with the present invention. The invention should not be considered as limited to the specific example presented.

EXAMPLE

Typical sucker fans have an operational temperature of approximately 180° F. with an air density at sea level of 0.062 lb/ft³. Reducing the air at fan temperature to approximately 110° F. with an air density at sea level of 0.0696 lb/ft³ increases the static capability of the fan approximately 12%, resulting in greater mass flow.

Additionally, it can be appreciated that the terms low-temperature heat exchanger circuits and high-temperature heat exchanger circuits are not limited to circuits wherein the inlet temperature of the low-temperature heat exchanger circuit is lower than the inlet temperature of the high-temperature heat exchanger circuit. In some systems, the temperature of the fluid entering into the inlet of the low-temperature heat exchanger circuit may actually be higher than the temperature of the fluid entering into the inlet of the high-temperature heat exchanger circuit. The reason for this is that the outlet temperature from the cooling module typically requires the low temperature fluid to be colder and relatively much closer to the ambient air temperature than the outlet of the high temperature heat exchanger circuit. As an example, an oil cooler may have an inlet temperature of approximately 225° F. and a required outlet temperature of approximately 150° F. being cooled by a 120° F. ambient airstream, while it is paired with a JW radiator having a 210° F. inlet temperature that is only cooled to 200° F. by the cooling module. The oil cooler, while actually having the hotter fluid, would need to be first in the airstream and in the sidewalls of the cooling module while the JW radiator would be in the top wall. It can also be appreciated that various fluids can be used in the cooling module including, but not limited to, oil, fuel, refrigerant, and the like.

While the present disclosure is satisfied by embodiments in many different forms, there is shown in the drawings, and described herein in detail, the preferred embodiments of the disclosure, with the understanding that the present disclosure is to be considered as exemplary of the principles of the disclosure and is not intended to limit the disclosure to the embodiments illustrated. Various other embodiments will be apparent to and readily made by those skilled in the art without departing from the scope and spirit of the disclosure. The scope of the disclosure will be measured by the appended claims and their equivalents.

What is claimed is:

1. A cooling module comprising:
    a box-shaped structure comprising at least four sides forming walls of the structure, the walls including at least four sidewalls and a top wall, the walls defining an open portion within the structure, wherein at least one of the sidewalls includes at least one low-temperature heat exchanger circuit and the top wall includes at least one high-temperature heat exchanger circuit that is separate from the at least one low-temperature heat exchanger circuit; and
    at least one fan located within the open portion of the structure, wherein the fan is configured to draw air from outside the structure through the at least one low-temperature heat exchanger circuit and redirect the air out of the structure through the at least one high temperature heat exchanger circuit.

2. The cooling module of claim 1, wherein at least two of the sidewalls comprise the at least one low-temperature heat exchanger circuit.

3. The cooling module of claim 2, wherein the at least two sidewalls comprising the low-temperature heat exchanger circuits are oppositely disposed with respect to each other and wherein the structure includes a bottom wall.

4. The cooling module of claim 2, wherein air from outside the structure flows through the low-temperature heat exchanger circuits and exits in an upward direction through the high-temperature heat exchanger circuit.

5. The cooling module of claim 1, wherein the at least one fan comprises a constant volumetric flow machine.

6. The cooling module of claim 5, wherein the at least one fan is configured to function as a sucker fan relative to the at least one low-temperature heat exchanger circuit and a blower fan relative to the at least one high-temperature heat exchanger circuit.

7. The cooling module of claim 1, wherein the at least one fan is enclosed within the sidewalls and the top wall of the structure.

8. The cooling module of claim 2, wherein the low-temperature heat exchanger circuits in the at least two sidewalls of the structure have a face area that is greater than a face area of the at least one high-temperature heat exchanger circuit.

9. The cooling module of claim 8, wherein the face area of the low-temperature heat exchanger circuits is at least twice as large as the face area of the at least one high-temperature heat exchanger circuit.

10. The cooling module of claim 1, wherein the at least low-temperature heat exchanger circuit and the at least one high-temperature heat exchanger circuit includes multiple cores.

11. The cooling module of claim 1, wherein the structure comprises a cuboid having six of the walls disposed orthogonal to each other.

12. The cooling module of claim 11, wherein the six of the walls comprise four sidewalls, a top wall, and a bottom wall, and wherein at least two of the sidewalls comprise the at least one low-temperature heat exchanger circuit, at least two others of the sidewalls comprise panels or the at least one low-temperature heat exchanger circuits, the top wall comprises the at least one high-temperature heat exchanger circuit, and the bottom wall comprises either a panel or the at least one low-temperature heat exchanger circuit.

13. The cooling module of claim 11, wherein two or more of the six walls are sized differently with respect to each other.

14. A cooling module for use with an internal combustion engine having separate cooling circuits, the cooling module comprising:
    (a) a cuboid shaped structure having walls defining an internal open portion, at least one of the walls comprising a low-temperature heat exchanger circuit and one of the walls comprising at least one high-temperature heat exchanger circuit that is separate from the low-temperature heat exchanger circuit; and
    (b) at least one fan located within the open portion of the structure and enclosed by the walls, wherein the fan is configured to draw air from outside the structure through the at least one low-temperature heat exchanger circuit and redirect the air out of the structure through the at least one high-temperature heat exchanger circuit.

15. The cooling module of claim 14, wherein the walls comprise four sidewalls, a top wall and a bottom wall, and wherein at least two of the sidewalls each comprises the low-temperature heat exchanger circuit and the top wall comprises the high-temperature heat exchanger circuit.

16. The cooling module of claim 15, wherein the fan comprises a constant volumetric flow machine that is configured to function as a sucker fan relative to the low-temperature heat exchanger circuits to draw air from the outside of the structure through the low-temperature heat exchanger circuits and to function as a blower fan relative to the high-temperature heat exchanger circuit to redirect and blow the air in an upward direction out of the structure through the high-temperature heat exchanger circuit.

17. The cooling module of claim 15, wherein the high-temperature heat exchanger circuit includes jacket water and is configured to cool an engine block and the low-temperature heat exchanger circuit is configured to cool turbo air from the engine.

18. The cooling module of claim 15, wherein the internal combustion engine is a diesel engine.

19. A cooling module comprising:
  a box-shaped structure formed by sidewalls interconnected with each other and defining an open portion of the structure, the structure also including a top wall interconnected with the sidewalls, at least one of the sidewalls including a first heat exchanger circuit and the top wall including a second heat exchanger circuit that is separate from the first heat exchanger circuit; and
  a fan positioned between the open portion defined by the sidewalls of the structure and the top wall, the fan positioned to draw air from outside the open portion of the structure through the first heat exchanger circuit in the at least one of the sidewalls and direct the air out of the open portion of the structure through the second heat exchanger circuit in the top wall.

20. The cooling module of claim 19, wherein the first heat exchanger circuit is a lower temperature heat exchanger circuit and the second heat exchanger circuit is a higher temperature heat exchanger circuit.

* * * * *